(12) United States Patent
Ranganathan et al.

(10) Patent No.: US 7,462,392 B2
(45) Date of Patent: Dec. 9, 2008

(54) BI-TAPERED REINFORCING FIBERS

(75) Inventors: Anandakumar Ranganathan, Arlington, MA (US); Klaus-Alexander Rieder, Beverly, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 428 days.

(21) Appl. No.: 11/346,647

(22) Filed: Feb. 3, 2006

(65) Prior Publication Data

US 2007/0184265 A1    Aug. 9, 2007

(51) Int. Cl.
*D02G 3/00* (2006.01)
(52) U.S. Cl. ............ 428/399; 428/294.7; 428/295.1; 428/297.4; 428/298.4; 428/295.7
(58) Field of Classification Search ......... 428/399, 428/294.7, 295.1, 297.4, 298.4, 295.7
See application file for complete search history.

(56) References Cited

U.S. PATENT DOCUMENTS

| | | | | |
|---|---|---|---|---|
| 2,418,492 A * | 4/1947 | Alfthan et al. | ........... | 264/167 |
| 3,592,727 A * | 7/1971 | Weaver et al. | ........... | 428/399 |
| 3,953,953 A | 5/1976 | Marsden | ........... | 428/603 |
| 4,229,501 A * | 10/1980 | Kern | ........... | 428/399 |
| 4,297,414 A * | 10/1981 | Matsumoto | ........... | 428/400 |
| 4,307,478 A * | 12/1981 | Ward et al. | ........... | 15/207.2 |
| 4,316,924 A * | 2/1982 | Minemura et al. | ........... | 428/89 |
| 4,389,364 A * | 6/1983 | Endo et al. | ........... | 264/167 |
| 4,451,534 A | 5/1984 | Akagi et al. | ........... | 428/372 |
| 4,565,840 A | 1/1986 | Kobayashi et al. | ........... | 524/8 |
| 4,585,487 A * | 4/1986 | Destree et al. | ........... | 106/644 |
| 4,603,083 A | 7/1986 | Tanaka et al. | ........... | 428/364 |
| 4,968,561 A | 11/1990 | Mizobe et al. | ........... | 428/397 |
| 5,091,254 A | 2/1992 | Mochizuki et al. | ........... | 428/364 |
| 5,466,505 A * | 11/1995 | Fukuda et al. | ........... | 428/91 |
| 5,858,487 A | 1/1999 | Boehler et al. | ........... | 428/34.3 |
| 5,981,630 A | 11/1999 | Banthia et al. | ........... | 524/8 |
| 5,985,449 A | 11/1999 | Dill | ........... | 428/399 |
| 6,045,911 A * | 4/2000 | Legrand et al. | ........... | 428/399 |
| 6,106,945 A | 8/2000 | Mayahara et al. | ........... | 428/397 |
| 6,197,423 B1 | 3/2001 | Rieder et al. | ........... | 423/397 |
| 6,265,056 B1 | 7/2001 | Rieder et al. | ........... | 428/294.7 |
| 6,503,625 B1 | 1/2003 | Rieder et al. | ........... | 428/339 |

(Continued)

FOREIGN PATENT DOCUMENTS

EP      0313068      4/1989

(Continued)

OTHER PUBLICATIONS

European Search Report for Application No. EP 07250455 dated Nov. 5, 2007, 2 pages.

*Primary Examiner*—N. Edwards
(74) *Attorney, Agent, or Firm*—Craig K. Leon; Stephan P. Williams

(57) ABSTRACT

Non-fractured, non-fibrillatable short fibers, for reinforcing matrix materials such as concrete, have substantially uniform transverse cross-sectional areas along their length for maximum efficiency in pull-out resistance, and two different tapering characteristics along their lengths. Preferred bi-tapered fibers of the invention have a high modulus of elasticity in the range of 5-250 Gigapascal and are preferably modulated in both tapering dimensions. Matrix materials containing the fibers, as well as a method for making the fibers, are disclosed.

23 Claims, 3 Drawing Sheets

U.S. PATENT DOCUMENTS

| | | | |
|---|---|---|---|
| 6,569,525 B2 | 5/2003 | Rieder et al. | 428/397 |
| 6,569,526 B2 * | 5/2003 | Rieder et al. | 428/397 |
| 6,592,790 B2 | 7/2003 | Rieder et al. | 264/103 |
| 6,596,210 B2 | 7/2003 | Rieder et al. | 264/138 |
| 6,678,921 B2 | 1/2004 | Despault et al. | 24/16 PB |
| 6,706,380 B2 * | 3/2004 | Edwards et al. | 428/292.1 |
| 6,758,897 B2 | 7/2004 | Rieder et al. | 106/802 |
| 6,773,646 B2 | 8/2004 | Rieder et al. | 264/138 |
| 6,863,969 B2 | 3/2005 | Rieder et al. | 428/294.7 |
| 7,138,178 B2 * | 11/2006 | Fujiwara et al. | 428/364 |
| 2007/0184265 A1 * | 8/2007 | Ranganathan et al. | 428/375 |

FOREIGN PATENT DOCUMENTS

| | | |
|---|---|---|
| JP | 57 094403 A | 6/1982 |
| JP | 06 263512 A | 9/1994 |
| JP | 06263512 | 9/1994 |
| JP | 2001261403 | 9/2001 |

* cited by examiner

BI-TAPERED REINFORCING FIBERS

FIELD OF THE INVENTION

The present invention relates to fibers for structurally reinforcing matrix materials such as concrete, and more particularly to non-stress-fractured, non-fibrillatable short fibers having a substantially uniform transverse cross-sectional area while varying in two tapering dimensions along their length, the fibers preferably modulating periodically in both tapering dimensions.

BACKGROUND OF THE INVENTION

Mortars and concretes are brittle materials comprising a hydratable cement binder and, in the case of mortar, a fine aggregate such as sand, and, in the case of concrete, a coarse aggregate such as crushed gravel or small stones. If a structure made from mortar or concrete is subjected to stresses that exceed its maximum tensile strength, then cracks can be initiated and propagated in that structure.

The ability of the structure to resist crack initiation is understood in terms of its "strength," which is proportional to the maximum load sustainable by the structure without cracking. This is measured by assessing the minimum stress load (e.g., the "critical stress intensity factor") required to initiate cracking.

On the other hand, the ability of the structure to resist propagation (or widening) of an existing crack is described as "fracture toughness." Such a property is determined by simultaneously measuring the load required to deform or "deflect" a fiber-reinforced concrete (FRC) beam specimen at an opened crack, and also by measuring the extent of deflection. The fracture toughness is therefore determined by dividing the area under a load deflection curve (generated from plotting the load against deflection of the FRC specimen) by its cross-sectional area.

Reinforcing fibers designed to increase both strength and fracture toughness properties are known and discussed in U.S. Pat. Nos. 6,197,423; 6,503,625; 6,265,056; 6,592,790; 6,596,210; and 6,773,646, which are owned by the common assignee hereof. In these patents, Rieder et al. disclosed "micro-diastrophic" polymer fibers having irregular and random displacements of polymer material, stress fractures, and microscopic elevated ridges.

Subsequently, in U.S. Pat. Nos. 6,529,525; 6,569,526; 6,758,897; and 6,863,969, also owned by the common assignee hereof, Rieder et al. disclosed polymer fibers having improved strength and fracture toughness while retaining dispersibility. By extruding and slitting a flat polypropylene film, and stretching the slit fibers using an extremely high stretch rate, Rieder et al. achieved fibers having a modulus of up to 20 Gigapascals. By avoiding the stress-fracturing of the aforementioned micro-diastrophic flattening technique, the structural integrity of the fibers could be preserved.

Slit polypropylene reinforcing fibers which provide high strength and fracture toughness in concrete are commercially available from Grace Construction Products, Cambridge, Mass., under the trade name "STRUX®."

One of the objectives of the present invention is to employ fibers having a modulus, at least 5 Gigapascals, and more preferably at least 20 Gigapascals and more, for increasing the ability of a fiber-reinforced matrix material to resist crack initiation.

Another objective is to provide fibers that enhance the fracture toughness of the matrix material, its ability to resist deflection or widening of existing cracks. The present inventors must, in other words, now consider how best to control pull-out resistance of high modulus fiber materials. This property must be considered with respect to the situation wherein the fibers span across a crack or opening in the matrix material.

In U.S Pat. No. 4,297,414, Matsumoto disclosed polyethylene fibers having protrusions. These are made by mixing polyethylene having a melt index of not more than 0.01 at 190° C. under a load of 2.16 kg with polyethylene having a melt index of more than 0.01, thereby to obtain a mixture having a melt index of 0.01 to 10. This mixture was extruded under such conditions as to create a jagged surface, which was then stretched to generate the surface protrusions. In order to achieve this extreme melt-fracturing of the surface after the stretching treatment, it was important that "the convexities and concavities of the extruded product should be as sharp and deep as possible" (Col. 3, 11. 35-39). While no doubt making it more difficult to pull the fibers out of concrete, these distressed protrusions and concavities are believed by the present inventors to create potential breakage points or distressed features, which could lead to premature breakage of the fibers and lowering the reinforcing efficiency for a certain dosage.

One of the concerns in steel fiber product design has been to increase fiber "pull out" resistance, because this increases the ability of the fiber to defeat crack propagation. In this regard, U.S. Pat. No. 3,953,953 of Marsden disclosed fibers having "J"-shaped ends for resisting pull-out from concrete. However, such morphology can create entanglement problems and make the fibers difficult to handle and to disperse uniformly within a wet concrete mix. Also, the J-shaped ends are believed by the present inventors to cause premature breakage at the stress-point caused by the folds of the "J" shape. At column 1, lines 54-56, Marsden indicated that the end portion of his fibers are supposed to be larger in cross-section than the smallest cross-section of the shank of the filament or fiber. He preferred that the end portions of his fibers be larger in both the longitudinal and transverse planar cross-sections. (See e.g., Col. 1, lines 54-56).

A similar large-end approach was taught in Japanese Patent Application No. JP06263512A2 of Kajima, who disclosed reinforcing short fibers that gradually tapered from both ends toward the central part of the fibers. The geometry of the Kajima's fibers, which resemble two slender conical sections joined at their tops, was designed to allow tensile stress on the fiber to be dispersed into a concrete or synthetic matrix, such that the short fiber is mutually compressed and restricted, thereby resisting crack openings in the matrix. The intent of Kajima is to distribute load on the fiber to the matrix such that the load is not concentrated on one point, so that propagation of cracking in the matrix is prevented by distributing the force throughout the matrix.

The present inventors believe that prior art fibers, such as those disclosed in Marsden and Kajima, lose reinforcing efficiency, because such fibers will tend to break at a narrowed mid-section. In other words, the small waist or smallest diameter will define the maximum load-carrying capacity of the individual fiber.

It follows that at the larger ends of such fibers, an excess of material in the circumferential diameter provides anchoring of the fiber by radial compression of the fiber ends during a crack-opening event in the surrounding matrix. However, this excess fiber material at both ends does not contribute to the maximum load-carrying capacity of the fiber, due to the fact that the breakage is designed to occur at the smallest diameter.

The reinforcing performance of the fiber is not, therefore, proportional to the amount of material used in the fiber.

Kajima's tapered fibers would also be difficult to manufacture. Kajima does not describe how one is to manufacture the bi-conical shape, or how such a tapered geometry can be manufactured on a continuous basis at high speed. While it can be surmised that the tapered conical shape can be made by casting metal or polymer material in a mold, it is doubtful that such a process would be practical for high volume applications such as for reinforcing concrete. If the Kajima fibers were to be manufactured by altering conditions of extrusion, such as narrowing the die opening or stretching the extruded polymeric material to decrease the circular diameter, the surface fracturing sought by Matsumoto might occur; this would defeat the purpose of Kajima, which is to distribute forces along the body of the fiber. "Crimped" polymer fibers are known for increasing pull-out resistance from concrete and other matrix materials. For example, a sinusoidal fiber is disclosed in U.S. Pat. No. 5,981,630 of Banthia et al. and illustrated as a waveform having a profile amplitude. One problem of crimped fibers, as noted in U.S. Pat. No. 5,985, 449 of Dill (Specialty Filaments), is that fiber balling (e.g., agglomeration) in concrete is difficult to avoid. Dill thus taught a bundling technique for aligning the fibers with each other so as to minimize self-entanglement.

Aside from the difficulty in dispersal, it is believed that crimping does not provide a wholly satisfactory solution to enhancing pull out resistance of the fibers. This is because a crack does not always occur at the longitudinal mid-section of a given fiber. The result is that crimped fibers can be pulled out of concrete or other matrix in something of a "snake-like" fashion.

A novel improved tapered fiber is needed which avoids the foregoing disadvantages, and which can be manufactured both conveniently and economically to achieve high reinforcing efficiency as well as controlled pull-out resistance.

SUMMARY OF THE INVENTION

In avoiding the disadvantages of the prior art, the present invention provides substantially non-stress-fractured, non-fibrillatable short reinforcing fibers having, on the one hand, substantially uniform transverse cross-sectional areas along their lengths; and, on the other hand, having at least two tapering dimensions along their lengths for resisting pull-out from concrete or other matrix material.

Maximum load-bearing capacity and controlled pull-out resistance of fibers are realized by having substantially uniform cross-sectional areas along the fiber length, by avoiding stress fractures created by mechanical flattening, and by avoiding surface anomalies such as protrusions or concavities caused by melt-fracture extrusion.

Exemplary bi-tapered fibers preferably have a length of 5-100 mm and more preferably 10-60 mm per fiber; an aspect ratio in terms of length to equivalent diameter of 10-500, and more preferably in the range of 25-100; a modulus of elasticity in the range of 5-250 Gigapascals, and more preferably in the range of 20-100 Gigapascals; a tensile strength of 400-2, 500 Megapascals; and a load carrying capacity of 50-5,000 Newtons per fiber.

When employed in matrix material such as concrete, the fibers ideally provide a balance between anchoring and pull-out when spanning a crack that occurs in the matrix material. In the case of cracked concrete, it is preferred that the fibers be designed such that half of the fibers spanning across the crack operate to pull out of the concrete while the other half of the fibers spanning the crack should break entirely at the point at which the concrete structure becomes pulled completely apart at the crack. Maximum energy is thus absorbed, from the time the cracked concrete begins to deform, until catastrophic failure of the concrete occurs.

The phrase "substantially uniform transverse cross-sectional area" means that the cross-sectional area of the fiber body should not vary by more than 10%, and more preferably by not more than 5%, along major axis Z which is defined by the shank or elongated portion of the fiber body. A uniform cross-sectional area is believed by the inventors to confer the highest reinforcing efficiency possible (unlike the thin-waisted midsections of the Marsden and Kajima fibers mentioned in the Background). Fibers of the present invention are short in that they are 5-100 mm in length, and more preferably 10-60 mm in length, and they preferably have an aspect ratio in terms of length to equivalent diameter of 10-500.

The phrase "two tapering dimensions" refers to and describes two different tapering behaviors within a given length of fiber. If the body or shank portion of the short bi-tapered fiber defines longitudinal major axis Z, then minor axes X and Y are defined as perpendicular to axis Z and to each other, and the transverse cross-sectional profile of the fiber increases or diminishes gradually in the directions of minor axes X and Y, even as the transverse cross-sectional area remains substantially uniform, from point to point along major axis Z. It is preferable to have the fibers straight along axis axis Z. As some bending of the fibers can occur during the processing and cutting of the fibers, which is not expected to diminish the performance, thus it is possible for the fibers to be bent, curved, twisted, or even crimped (and hence the Z axis will be deemed to have such geometry for definitional purposes herein), but again it is preferred that the fiber body or shank portion be as straight as possible.

Thus, exemplary fibers of the invention comprise a fiber body having two opposed ends defining therebetween an intermediate elongated body (or shank) portion which is substantially non-stress-fractured and substantially non-fibrillatable upon mixing into a matrix material such as cementitious composites, concrete, shotcrete, mortar, asphalt, or synthetic polymer, the body portion defining longitudinal major axis Z and comprising (A) a substantially uniform transverse cross-sectional area that deviates no more than 10%, and more preferably no more than 5%, along the length of the elongated body portion which defines longitudinal major axis Z; and (B) a transverse cross-sectional profile having two tapering dimensions for pull out-resistance, the first tapering dimension occurring in a first transverse minor axis X that is perpendicular to axis Z, the second tapering dimension occurring in a second transverse minor axis Y that is perpendicular to both axes X and Z; the first and second tapering dimensions having inverted tapering behaviors wherein, as one moves from point to point along axis Z, (i) the first tapering dimension along axis X increases as the second tapering dimension along axis Y decreases, (ii) the first tapering dimension along axis X decreases as the second tapering dimension along axis Y increases, and/or (iii) both aforementioned tapering characteristics described in (i) and (ii) herein are present.

A number of transverse cross-sectional profiles of the fiber are possible, including but not limited to a circle, oval, square, triangle, or rectangle shapes, other quadrilateral shapes, and polygonal shapes, and can modulate between any of these shapes. The profile can modulate between a first shape having a first X/Y ratio (measurement along X minor axis divided by measurement along Y minor axis) and a second shape having a second X/Y ratio that is different from the first profile. Preferably, the profile of a fiber modulates between first and second X/Y ratios at least once, and more preferably two to fifteen times. It may be possible to have up to thirty modulations depending on the nature of the fiber and matrix materials.

The present invention also pertains to matrix materials, including hydratable cementitious materials containing the fibers, as well as methods for making the fibers.

Further advantages and features of the invention are further described in detail hereinafter.

BRIEF DESCRIPTION OF DRAWINGS

An appreciation of the advantages and benefits of the invention may be more readily comprehended by considering the following written description of preferred embodiments in conjunction with the accompanying drawings, wherein.

DETAILED DESCRIPTION OF PREFERRED EMBODIMENTS

Figure 1A:
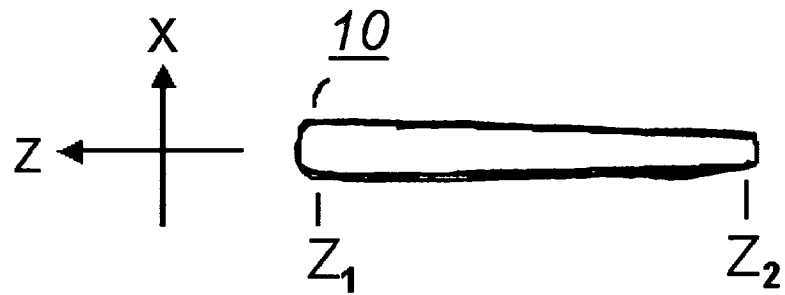
FIG. 1A is an illustration of an exemplary short fiber of the present invention viewed along the Y axis (which is perpendicular to the indicated X and Z axes) wherein a first tapering behavior is shown between first position $Z_1$, second position $Z_2$.

As mentioned in the Summary above, fibers of the present invention are substantially non-stress-fractured and substantially non-fibrillatable. These two fiber characteristics are defined, for example, in U.S. Pat. No. 6,569,526 of Rieder et al., also owned by the common assignee hereof.

By "non-stress-fractured," the present inventors mean and refer to individual fiber bodies which are substantially free of internal and external stress fractures, such as might be created by grinding methods, mechanical flattening methods (Compare e.g., U.S. Pat. No. 6,197,423 of Rieder et al.), or by extrusion methods which distress the surface of the fibers (See e.g., U.S. Pat. No. 4,297,414 of Matsumoto). The general intent here is to maintain integrity of the individual fiber bodies, not only in terms of structural fiber integrity, but also integrity and uniformity of the total surface area which contacts the surrounding matrix material, such that pull-out resistance behavior can be more carefully controlled by the manufacturer from one fiber batch to the next.

By "non-fibrillatable," the present inventors mean and refer to individual fiber bodies that do not substantially reduce into smaller fiber or fibril units when mechanically mixed into and agitated within the matrix composition to the extent necessary to achieve substantially uniform dispersal of fibers in the mix. For example, when introduced into a matrix material such as concrete, which contains sand and stone aggregates, the fibers of the invention should not reduce into smaller fibrillar bodies during the time required for mixing the fibers such that they are evenly dispersed in the concrete.

The term "substantially" is used for modifying the phrases "non-stress-fractured" and "non-fibrillatable" because, during manufacture of the fibers or mixing of the fibers into concrete, it is possible for some surface blemishes or threads to be seen at a microscopic level, particularly where the fiber are extruded from synthetic polymer. Such microscopic phenomena are due to imperfections in the polymer or to the extrusion process and/or due to roughening of the fiber surface on account of mixing in aggregate-containing concrete. Such microscopic events, then, are not considered manifestations of stress-fracturing or fibrillation in the sense contemplated by the inventors.

The term "matrix materials" includes a broad range of materials that can be reinforced by fibers, including adhesives, asphalt, ceramics, composite materials (e.g., resins), plastics, elastomers such as rubber, and structures made from these materials.

Preferred matrix materials of the invention include hydratable cementitious compositions such as paste, mortar, ready-mix concrete, pre-cast concrete, shotcrete, grout, screed, gypsum-based concretes (such as compositions for wall-boards), gypsum- and/or Portland cement-based fireproofing compositions, waterproofing membranes and coatings, and other hydratable cementitious compositions, which can be supplied in dry or wet mix form.

Fibers of the invention are used in the paste portion of a hydratable wet "cement," "mortar," or "concrete." These all have pastes which are mixtures composed of a hydratable cementitious binder (usually, but not exclusively, Portland cement, masonry cement, or mortar cement, and may also include limestone, hydrated lime, fly ash, granulated blast furnace slag, pozzolans, and silica fume or other materials commonly used in such cements) and water. Mortars are pastes additionally including fine aggregate, such as sand. Concretes are mortars additionally including coarse aggregate such as small stones and crushed gravel. "Cementitious compositions" of the invention thus refer and include all of the foregoing. For example, a cementitious composition may be formed by mixing required amounts of certain materials, such as hydratable cementitious binder, water, and fine and/or coarse aggregates, as may be desired, with the fibers described herein.

Exemplary fibers of the invention may comprise metal (e.g., steel) or one or more synthetic polymers selected from the group consisting of, but not limited to, polyvinyl alcohol, polyethylene (including high density polyethylene, low density polyethylene, and ultra high molecular weight polyethylene), polypropylene, polyoxymethylene, polyamide, and thermotropic liquid crystal polymers. The preferred geometry can also be obtained with a composite material such as a bundle of fine filaments or fibrils bonded together by a suitable resin or inorganic binder to form a thicker "macro-fiber" unit. For example, individual fiber bodies may comprise continuous fine carbon or aromatic polyamide (commonly known as KEVLAR® material) or glass/ceramic or ultrahigh molecular weight polyethylene or even metal fiber filaments of very high modulus and strength bonded together by resins such as nylon, epoxy, polyolefin, and others, to provide a composite fiber possessing the required modulus and strength. Other possible materials from which the fibers can be formed include metals (e.g., steel, stainless steel), inorganic (e.g.: glass, ceramic)).

The drawings provide illustration of various exemplary fibers to facilitate comprehension of the present invention. They are presented to emphasize the tapering concept and are not drawn to scale. The fibers have two opposing ends which define therebetween an intermediate body or shank portion which coincides with and defines a longitudinal and centrally located major axis Z. Thus, if the fiber is bent, curved, or twisted, it must be physically straightened by hand or held by other means so that the fiber can be properly viewed and considered in three dimensional space for purposes of the present invention. One transverse minor axis which is perpendicular to the major axis Z will be designated the axis X (and this will usually correspond to the width, or wider dimension, of the fiber); and a second transverse minor axis which is perpendicular to both the minor axis X and longitudinal major axis Z will be designated as axis Y (and this will usually correspond to the thickness dimension where the fiber has an oval, rectangular, or otherwise flat cross-sectional shape or profile).

The present inventors contemplate that it is possible to have more than two different tapering dimensions, and that the at least two tapering dimensions need not necessarily be at 90 degree angles with respect to each other. It is possible, therefore, to have one tapering dimension which resides at, for example, a 45 degree angle with respect to the second tapering dimension. For small fibers as contemplated in the present invention, however, it is believed that having an approximately 90 degree angle (perpendicular) for the at least two tapering dimensions is most convenient.

As shown in FIG. 1A, an exemplary short bi-tapered fiber 10 of the present invention has a first tapering behavior or characteristic when viewed along the transverse minor Y axis, which is perpendicular to the transverse minor X axis and longitudinal major axis Z. The major axis Z coincides with and is defined by the elongated body portion (or shank) of the fiber 10 between one end, which is designated first position $Z_1$, and the other end, which is designated as second position $Z_2$. This first tapering behavior is seen, when moving the eyes from left to right of the illustration, as a gradual narrowing of the width from $Z_1$ to $Z_2$ along the length of the fiber 10.

Figure 1B:
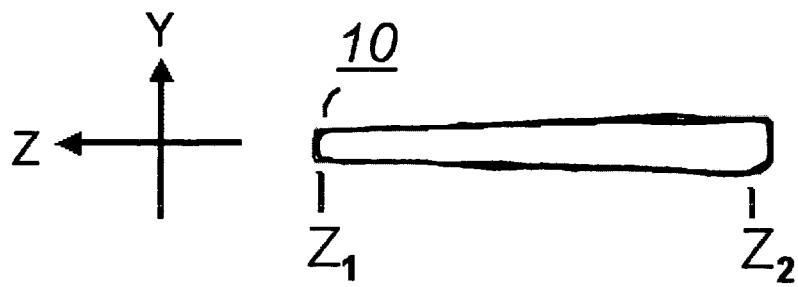
FIG. 1B is an illustration of the fiber of FIG. 1A viewed along the X axis (which is perpendicular to the indicated Y and Z axes) wherein a second tapering behavior is shown between first position $Z_1$, and second position $Z_2$.

FIG. 1B illustrates a second tapering behavior or characteristic of the exemplary bi-tapered fiber illustrated in FIG. 1A when rotated 90 degrees about its longitudinal major axis Z. The fiber, as shown in FIG. 1B, is viewed along transverse minor axis X, which is perpendicular to the transverse minor axis Y and longitudinal major axis Z. The second tapering behavior is seen, when moving the eyes from left to right of the illustration, as a gradual thickening from $Z_1$ to $Z_2$ along the length of the fiber 10.

Figure 1C:
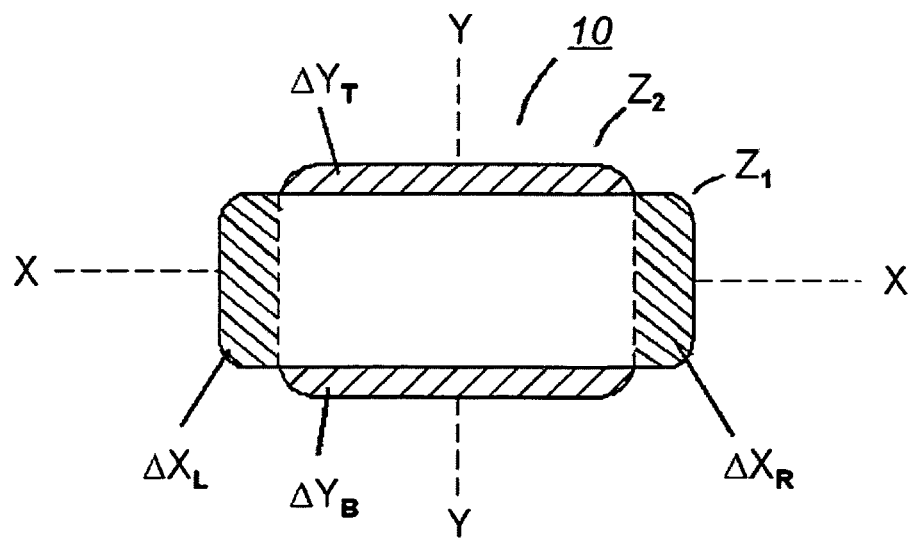
FIG. 1C is an illustrative representation of the fiber shown in FIGS. 1A and 1B wherein the cross-sectional areas at first position $Z_1$ and second position $Z_2$ are shown overlapping.

FIG. 1C is a composite illustration of the transverse cross-sectional profiles, taken at first position $Z_1$ and second position $Z_2$, of the exemplary bi-tapered fiber 10 illustrated in FIGS. 1 and 2, when viewed along longitudinal major axis Z. Minor transverse axis X is designated in the horizontal direction of FIG. 1C, while minor transverse axis Y is designated in the vertical direction of FIG. 1C. Hence, the cross-sectional profiles of the exemplary bi-tapered fiber 10 at $Z_1$ and $Z_2$ are shown as an overlapping composite illustration. The shaded portions located along the minor X axis and designated as $\Delta X_L$ (located to the left of the Y axis) and $\Delta X_R$ (located to the right of the Y axis) represent the change in cross-sectional area occurring in the fiber 10 starting at first location $Z_2$ and progressing towards second location $Z_1$. The shaded portions located along the minor Y axis and designated as $\Delta Y_T$ (located above the X axis) and $\Delta Y_B$ (located below the X axis) represent the change in cross-sectional area occurring in the fiber between first fiber location $Z_1$ and second fiber location $Z_2$. The difference between the sum total of $\Delta X_L$ and $\Delta X_R$ should be no more than 10%, and more preferably no more than 5%, of the sum total of $\Delta Y^T$ and $\Delta Y^B$; one of the purposes of the present invention is to achieve fibers having a substantially uniform transverse cross-sectional area along longitudinal axis Z.

In further preferred embodiments of the invention, the amount of tapering can be determined in accordance with the following relationship:

$$\Delta R/\Delta L \propto (\sigma \cdot A)/(\epsilon \cdot n \cdot L_f)$$

wherein "$\epsilon R$" represents the change between the ratio R at $Z_1$ and the ratio R at $Z_2$ (wherein R=width/thickness); "$\Delta L$" represents the length along axis Z of one modulation (e.g., the distance between $Z_1$ and $Z_2$ in FIGS. 1A and 2A); "$\sigma$" represents fiber tensile strength; "A" represents fiber cross-sectional area; "$\epsilon$" represents the fiber compressive modulus; "n" represents the number of modulations per fiber length; and "$L_f$" represents the total length from end to end of the individual fiber.

The softer the fiber material, the larger is the tapering or amplitude in the profile dimensions, e.g., along transverse axes X and Y.

Figure 2A:
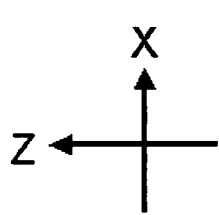
FIG. 2A is an illustrative representation of another exemplary fiber of the present invention viewed along the Y axis (which is perpendicular to the indicated X and Z axes) wherein a first tapering behavior is shown.
Figure 2A:
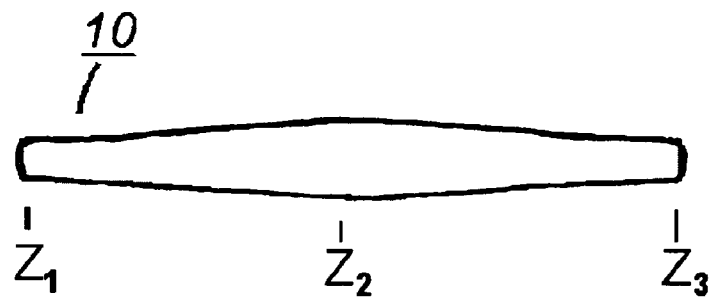

Another exemplary bi-tapered fiber 10 of the present invention is shown in FIG. 2A. The fiber 10, which is viewed along transverse minor axis Y, has a gradual widening, when viewed from left to right of the illustration, between first fiber location $Z_1$ and second fiber location $Z_2$, and a gradual narrowing in width between second fiber location $Z_2$ and third fiber location $Z_3$. The same fiber 10 is shown along transverse minor axis X in FIG. 2B. It has a corresponding gradual decrease in thickness between first location $Z_1$ and a second location $Z_2$, and a corresponding gradual increase in thickness between second location $Z_2$ and third location $Z_3$. A composite illustration of the cross-sectional profiles, taken at $Z_1$, $Z_2$, and $Z_3$, when viewed in the direction along major axis Z, may resemble the composite overlapping illustration of the profiles shown in FIG. 1C. While it is possible that the different cross-sectional profiles be used for $Z_1$ and $Z_3$ could be different, this is not preferable.

Figure 2B:
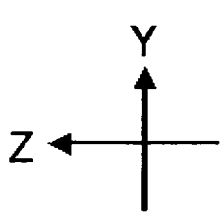
FIG. 2B is another illustrative representation of the fiber of FIG. 2A viewed along the X axis (which is perpendicular to the indicated Y and Z axes) wherein a second tapering behavior is shown.
Figure 2B:
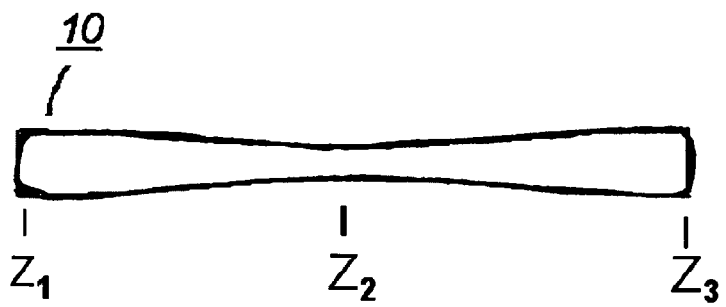

The bi-tapered fiber 10 shown in FIGS. 2A and 2B can be said to have two modulations (i.e., from $Z_1$ to $Z_2$ and from $Z_2$ to $Z_3$). The cross-sectional profiles or shapes at $Z_1$ and $Z_3$ are the same, and it is preferred that the distance $Z_1$ to $Z_2$ and distance from $Z_2$ to $Z_3$ be approximately the same, such that the fiber 10 is said to have two modulations or one complete modulation period or cycle of modulation.

Figure 3A:
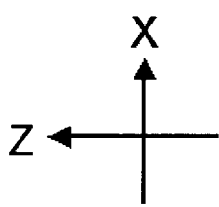
FIG. 3A is an illustrative representation of another exemplary fiber of the present invention viewed along the Y axis (which is perpendicular to the indicated X and Z axes) wherein a first tapering behavior is shown.
Figure 3A:
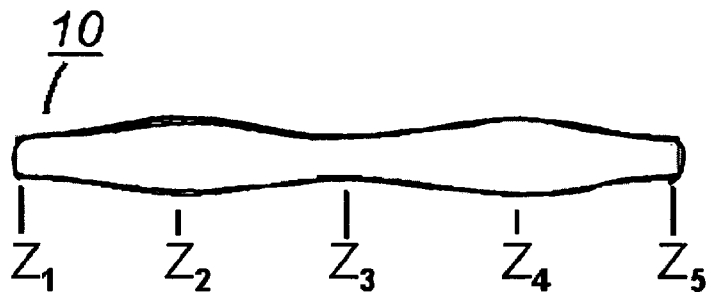
Figure 3B:
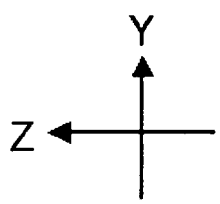
FIG. 3B is another illustrative representation of the fiber of FIG. 3A viewed along the X axis (which is perpendicular to the indicated Y and Z axes) wherein a second tapering behavior is shown.
Figure 3B:
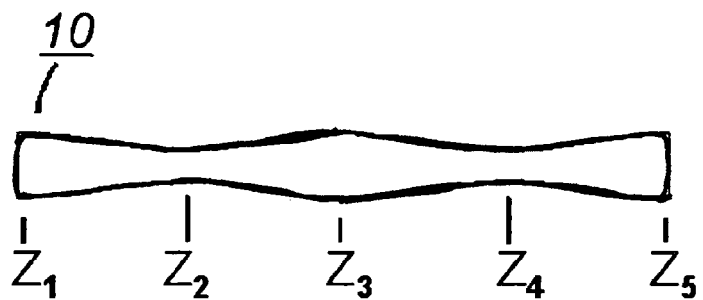

A further exemplary bi-tapered fiber 10 of the present invention is shown in FIGS. 3A and 3B. The fiber 10, which is viewed in FIG. 3A along transverse minor axis Y, has a gradual widening from Zhd 1 to $Z_2$ and from $Z_3$ to $Z_4$ and a gradual narrowing in width from $Z_2$ to $Z_3$ and $Z_4$ to $Z_5$. The fiber 10, when viewed along transverse minor axis X in FIG. 3B, has a corresponding gradual decrease in thickness from $Z_1$ to $Z_2$ and from $Z_3$ to $Z_4$ and a gradual increase in thickness from $Z_2$ to $Z_3$ and $Z_4$ to $Z_5$. Preferably, the cross-sectional profiles of $Z_2$ and $Z_4$ are the same, while the cross-sectional profiles of $Z_1$, $Z_3$, and $Z_5$ are the same, and the distances between $Z_1$, $Z_2$, $Z_3$, $Z_4$, and $Z_5$ are the same, such that the exemplary fiber 10 as shown in FIGS. 3A and 3B can be said to have four modulations or two complete modulation periods or cycles of modulation.

While the exemplary fibers of FIGS. 1A-1B, 2A-2B, and 3A-3B were shown with fiber ends coinciding with extremest cross-sectional profile dimensions (i.e., of largest or least dimensions along axis X or axis Y), this was intended for illustrative purposes only, because the present inventors do not believe it necessary that the fiber length be cut so precisely as to coincide with greatest width portion (X axis) or thinnest portion (Y axis). This will be the case particularly where the individual fiber bodies have two or more modulations (or cycles of modulation).

Accordingly, exemplary fibers can have at least two modulations wherein the cross-section profile of the fiber increases and decreases in width corresponding to a decrease and increase in thickness. Further exemplary fibers can have at least four modulations wherein the cross-section profile of the fiber twice increases and twice decreases in width corresponding, respectively, to two decreases and two increases in thickness.

Due to the unique geometry of the fibers, a single fiber can be obtained by cutting at any two points along axis Z. Theoretically, there is no minimum (or even a fraction of) or maximum number of modulations required in a single fiber as long as the width/thickness ratios (X/Y) are different on both sides of a reference point on the Z axis of the fiber. Preferred fibers will have at least one modulation and preferably no more than thirty modulations per fiber body. Thus, if a crack opens in the surround matrix material, more fibers within the batch of fibers used for treating the matrix material, will have a chance to resist crack opening regardless of whether the crack exists towards the middle or near the ends of the individual fibers.

Figure 4:
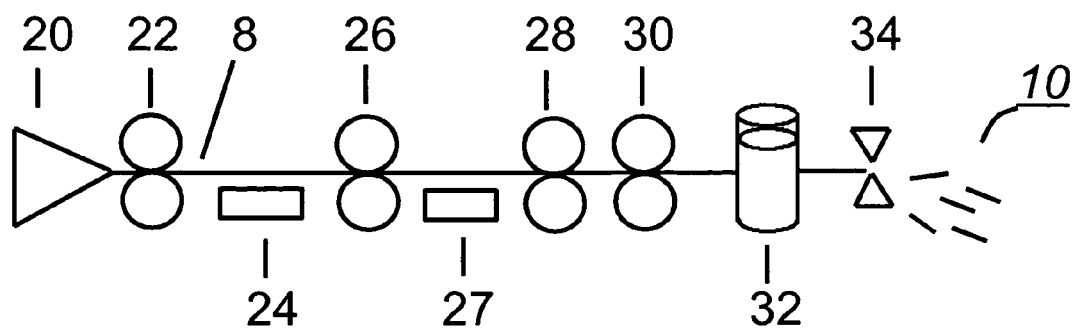
FIG. 4 is an illustrative diagram of an exemplary method of the invention for making fibers.

FIG. 4 is an illustrative diagram of an exemplary method of the invention for making fibers 10. In the case of synthetic polymer fibers, the polymer material is extruded through a die 20 or other extrusion device preferably in a monofilament 8 or sheet form, is cooled 24 such as by running through a water bath or between chill rolls. If the polymer is in sheet form, then it should be slit into individual fibers after this cooling stage. The individual fiber strands are then oriented (or stretched) in the longitudinal direction to increase the (Young's) modulus of elasticity. Optionally, this can be done by drawing the polymer between opposed rollers 26, through a thermal softening zone 27 (using an oven, hot air blower, or other heating device), and then through another set or sets of opposed rollers rotating at a much faster rate (e.g., 5-10 and more preferably 5-25 times faster than rollers 26). After the optional orienting/stretching stage, the polymer strands 8 are shaped to have a modulating profile by drawing the polymer between opposed rollers 30 having outer circumferential surfaces having periodic undulations therein for deforming the polymer and create a tapering feature in at least one dimension. The present inventors believe that it may be possible for one set of rollers (such as designated at 30) to induce tapering modulations in two dimensions (both axis X and axis Y directions) of the fiber material. Optionally, a second pair of rollers 32 having circumferential surface undulations may be employed. Even though two opposing rollers having outer circumferential surfaces with periodic undulations are preferred, it is possible to achieve desired results from only one of the rollers having periodic undulations and the other with circular circumference. Alternatively, both rollers can be of circular circumference with suitable diameter and one of them can be oscillated with controlled amplitude and frequency in a direction perpendicular to the fiber axis and the other being stationary.

Figure 5:
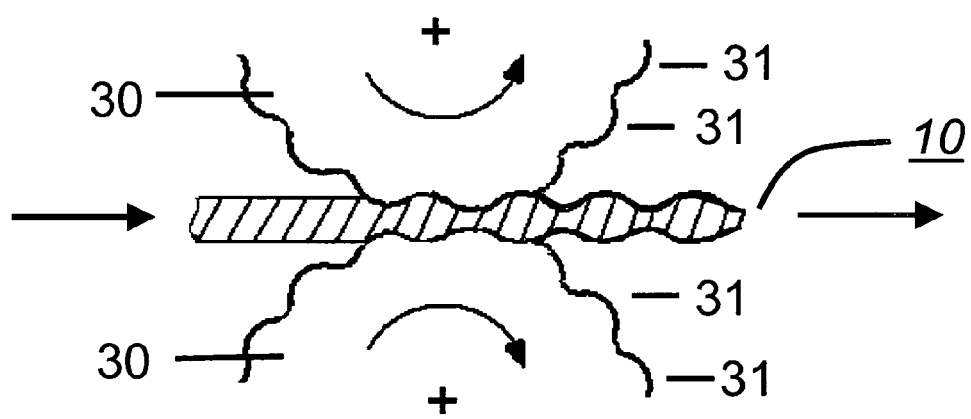
FIG. 5 is an illustration of a fiber material being shaped between opposed rollers having undulations in their circumferential surfaces for imparting a gradual tapering or bi-tapering features on the fiber.

FIG. 5 is an illustration of a fiber material 8 being shaped between opposed rollers 30 having undulations 31 on their circumferential surfaces for imparting a modulated tapering effect on the fiber 10. (Another set of these rollers having the same or similar undulations can be employed as the perpendicularly angled rollers 32 shown in FIG. 4). As shown in FIG. 5, the number of undulations 31 per inch (or cm), the amount of curvature of the undulations, the gap between the roller 30 surfaces, and the temperature of the fiber (some elevation of temperature above room temperature is desirable, if the polymer is not heated in the optional orienting/stretching stage) are all within the control of the skilled artisan to achieve the desired gradual tapering.

Again, it may be possible to achieve the bi-tapering effect described above merely by using one set of opposed rollers where, for example, displacement of polymer is achieved primarily in one of the transverse axis directions (e.g., axis X). For example, the undulations 31 of the rollers 30 are used to control the thickness tapering (in the direction of Y axis) while the polymer displaced provides the width-wise tapering (in the direction of the X axis). Optionally, another set of opposed rollers 32 as shown in FIG. 4 can be used, this time aligned with their rotational axes perpendicular to the rotational axes of rollers 30 to achieve an accurate tapering feature in the dimension perpendicular to opposed rollers 32. The curvature of the undulations on the circumferential surface of this other set of opposed rollers 32 may be slightly different than the undulation curvature on the first set of opposed rollers 30, in order to maintain a substantially uniform cross-sectional area along the length of the fiber body.

Preferably, each of the rollers used in a set of opposed rollers has undulations that are evenly spaced around their circumferential surfaces, and each of the rollers within a given set of rollers are mechanically linked, such as by gears, such that they rotate at the same rate and such that the undulations of each roller coincide with the undulations of the opposed roller during rotation.

An exemplary process of the present invention therefore comprises compressing a metal or polymer fiber between opposed rollers having circumferential surfaces having matched undulations which periodically repeat in identical patter on each of said opposed rollers, thereby creating a tapering of fiber material in each of two transverse dimensions perpendicular to the longitudinal major axis of the fiber.

In a further exemplary process of the present invention for making fibers comprises extruding a polymeric material to form a monofilament fiber body, optionally stretching the polymer to orient the material, and shaping the fiber material using a first set of opposed rollers having circumferential undulations conformed to impress a tapering effect into the fibers. The opposed rollers can be operative to create tapering effects in each of two transverse dimensions, which are perpendicular to each other (or at least 45 degrees apart) and to the longitudinal major axis of the fiber. If not, then alternatively a second set of opposed rollers can be used which are arranged so as to have their rotational axes perpendicular to the rotational axes of said first set of opposed rollers, so as to achieve a tapering effect in a second dimension. The rotation and spacing of the rollers and roller sets should be designed such that the cross-sectional area of the fiber remains substantially constant (i.e., ±10% or less) along the fiber length.

In further exemplary embodiments of the invention, the fibers can comprise two different sets of individual fibers, wherein a first set of fibers comprises the above-described bi-tapered fibers, and a second set of fibers comprises fiber bodies having a different fiber body geometry or body dimensions. For example, the second set of fibers may not contain bi-tapered bodies, but may otherwise have different geometrical shapes, such as flat ribbon (quadrilateral), round, oval, rectangular, or other cross-sectional profile shapes. The second set of fibers can also be bi-tapered but having different taper dimensions in terms of modulation distance (e.g., between $Z_1$ and $Z_2$) or distension (change in width or thickness) when compared to the first set of fibers.

Moreover, the fibers of the present invention, though having elongated bodies (or shank portions), do not necessarily need to be straight, since some bending, curving, twisting, or crimping may naturally occur during the manufacture or packaging process.

The present invention is not to be limited by the foregoing examples and illustrations, which are provided for illustrative purposes only.

It is claimed:

1. Fibers for reinforcing a concrete or other matrix material, comprising:

fiber bodies having two opposed ends defining therebetween an intermediate elongated fiber body portion which is substantially non-fractured and non-fibrillatable when mixed into a matrix material such as concrete, shotcrete, mortar, grout, or synthetic polymer, the fiber body portion having a length of 5 mm - 100 mm;

the body portion defining longitudinal major axis Z and comprising a transverse cross-sectional profile having two tapering dimensions for pull out-resistance from the concrete or other matrix material, the first tapering dimension occurring in a first transverse minor axis X that is perpendicular to axis Z, the second tapering dimension occurring in a second transverse minor axis Y that is perpendicular to both axes X and Z;

the first and second tapering dimensions having inverted tapering behaviors wherein, alone axis Z, the first tapering dimension along axis X increases as the second tapering dimension along axis Y decreases, and the first tapering dimension along axis X decreases as the second tapering dimension along axis Y increases;

the transverse cross-sectional area remaining substantially uniform along axis Z having said inverted tapering dimensional behaviors; and said fibers having an aspect ratio in terms of length to eguivalent diameter of not less than 10 and not greater than 500, a modulus of elasticity not less than 5 Gigapascals and not greater than 250 Gigapascals, a tensile strength not less than 400 Megapascals and not greater than 2,500 Megapascals, and a load carrying capacity of not less than 50 Newtons per fiber and not greater than 5,000 Newtons per fiber.

2. The fibers of claim 1 wherein said fibers have a length of not less than 10 mm and not greater than 60 mm.

3. The fibers of claim 1 wherein said fibers have an aspect ratio in terms of length to equivalent diameter of not less than 25 and not greater than 500.

4. The fibers of claim 1 having a modulus of elasticity not less than 20 Gigapascals and not greater than 100 Gigapascals.

5. The fibers of claim 1 wherein the fibers have a cross-sectional area that does not vary by more than 10% along the length of the fibers.

6. The fibers of claim 5 wherein the fibers have a cross-sectional area that does not vary by more than 5% along the length of the fibers.

7. The fibers of claim 1 having at least one quarter modulation wherein the cross-section profile of the fiber increases and decreases in width corresponding to a decrease and increase in thickness.

8. The fibers of claim 7 having at least one modulation wherein the cross-section profile of the fiber once increases and once decreases in width corresponding, respectively, to one decrease and one increase in thickness.

9. The fibers of claim 1 having no less than two modulations and no greater than thirty modulations per fiber body.

10. The fibers of claim 1 having a cross-sectional profile modulating between a first shape having a first X/Y ratio (measurement along X minor axis divided by measurement along Y minor axis) and a second shape having a second X/Y ratio that is different from the first profile.

11. The fibers of claim 10 wherein said profile modulates between said first and second X/Y ratios no greater than thirty times.

12. The fibers of claim 1 comprising a metal or polymer.

13. The fibers of claim 1 comprising a polymer selected from the group consisting of polyvinyl alcohol, polyethylene, low density polyethylene, ultra high molecular weight polyethylene), polypropylene, polyoxymethylene, polyamide, and thermotropic liquid crystal polymers.

14. The fibers of claim 1 wherein said fibers comprise polypropylene.

15. The fibers of claim 1 wherein said fibers comprise polyvinyl alcohol.

16. The fibers of claim 1 wherein said fiber bodies comprise smaller fibril units bonded together by a binder or resin.

17. The fibers of claim 1 being formed of metal and having no less than one modulation and no greater than thirty modulations in cross-sectional profile dimensions per fiber.

18. The fibers of claim 1 comprising a polymer selected from the group consisting of polyvinyl alcohol, polyethylene, high density polyethylene, low density polyethylene, ultra high molecular weight polyethylene, polypropylene, polyoxymethylene, polyamide, and thermotropic liquid crystal polymer; said fibers having no less than two modulations and no greater than eighteen modulations in cross-sectional profile dimensions per fiber.

19. A matrix material containing the fibers of claim 1.

20. The fibers of claim 1 comprising at least two different sets of individual fibers, wherein a first set of fibers comprises the bi-tapered fibers of claim 1, and a second set of fibers have a fiber body geometry or body dimensions different from said first set of fibers.

21. The fibers of claim 20 wherein said second set of fibers does not contain bi-tapered bodies.

22. The fibers of claim 20 wherein said second set of fibers comprises bi-tapered bodies having different tapering dimensions in terms of modulation distance or distension when compared to said first set of fibers.

23. The fibers of claim 1 wherein the bodies of said fibers are bent, curved, or crimped.

* * * * *

UNITED STATES PATENT AND TRADEMARK OFFICE
CERTIFICATE OF CORRECTION

| | |
|---|---|
| PATENT NO. | : 7,462,392 B2 |
| APPLICATION NO. | : 11/346647 |
| DATED | : December 9, 2008 |
| INVENTOR(S) | : Ranganathan et al. |

It is certified that error appears in the above-identified patent and that said Letters Patent is hereby corrected as shown below:

Column 11, line 39, "alone" should read --along--.

Signed and Sealed this

First Day of September, 2009

David J. Kappos
*Director of the United States Patent and Trademark Office*